Feb. 6, 1968     W. W. NIELSEN ETAL     3,367,951
PROCESS FOR PURIFYING SOLID PEROXIDES
Filed April 10, 1964
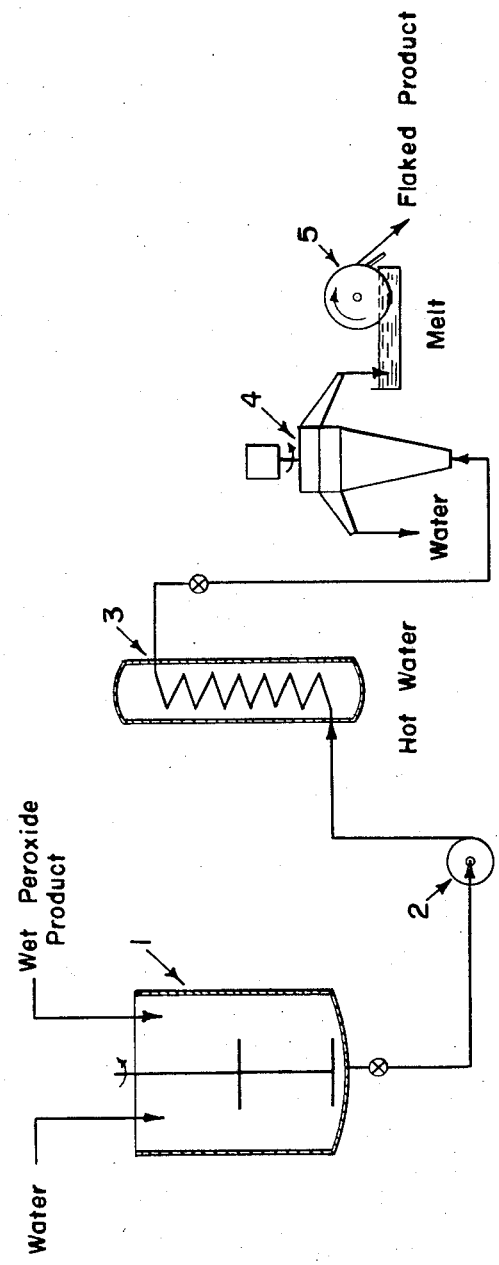
INVENTORS
William W. Nielsen
Ronald L. Friedman
Whitney E. Lawrence
Townsend and Townsend
attorneys

United States Patent Office 3,367,951
Patented Feb. 6, 1968

3,367,951
PROCESS FOR PURIFYING SOLID PEROXIDES
William W. Nielsen, El Cerrito, and Ronald L. Friedman and Whitney E. Lawrence, Pinole, Calif., assignors to U.S. Peroxygen Corporation, Richmond, Calif.
Filed Apr. 10, 1964, Ser. No. 358,707
11 Claims. (Cl. 260—406)

ABSTRACT OF THE DISCLOSURE

Method for purifying fatty acid peroxides by heating the peroxide in an aqueous mixture to a temperature just above the melting point of the peroxide to bring it into the liquid phase. The organic and aqueous liquid phases are then physically separated while the peroxide is held at the elevated temperature to maintain its liquid phase. Water soluble impurities are separated with the aqueous phase. The liquid peroxide is then cooled to a dry, pure solid.

---

This invention relates to the preparation of solid fatty acid peroxides. More particularly, it relates to an improvement in the purification of such materials to remove impurities including water.

Present practice for separating residual water from solid fatty acid peroxides to render them sufficiently dry for commercial purposes involves spreading the compound in a relatively thin layer onto the porous bed of a dryer and forcing warm air through the layer. For example, it is conventional to use a rotating bed dryer in which the bed is in the form of a continuous porous belt and warm air is forced downwardly through the belt. Another machine utilized is the Wyssmont cylindrical dryer which employs the same general principle and forces warm air across the material to be dried. These techniques require large and costly equipment, are slow in operation, and are relatively inefficient.

The present invention is the very antithesis. It contemplates the use of very simple and inexpensive equipment, is fast, efficient, and has an exceptionally high capacity for the drying of solid fatty acid peroxides. Moreover, in the very same procedure executed here for separating water it has been found that other highly undesirable impurities usually found in fatty acid peroxides such as free fatty acid, soaps of the acid, and iron are almost entirely removed from the peroxide. Purities in excess of 98% are easily obtained with the present invention. It will be appreciated that removal of these impurities is quite important since they adversely affect the utility and efficiency of the peroxides as catalysts. For example, iron causes decomposition of the peroxide while the other mentioned impurities slow down polymerization and terminate polymer chains leading to lower molecular weight polymers.

The accompanying drawing illustrates a schematic flow sheet for the practice of the present process.

Briefly the present invention provides a method for separating impurities and water from a mixture of water and an impure solid fatty acid peroxide which comprises adjusting the temperature of the water-peroxide mixture to above the melting point of the peroxide but below its decomposition temperature to liquidify the peroxide. The aqueous phase is then physically separated from the liquified peroxide phase. Following this separation, the peroxide phase is cooled to cause its solidification. Unexpectedly, during this procedure almost all impurities become associated with the aqueous phase and are separated with it.

The separation of water from the peroxide in accordance with the present process takes advantage of the non-miscibility of water and the hot liquid organic peroxide phase. While this may at first blush appear a simple enough concept, the discovery of its applicability to the present materials was most surprising. Thus, the fact that such a technique could be utilized with solid fatty acid peroxides was most unexpected due to the unstable properties of organic peroxides in general and the specific properties of the present peroxides that have been reported in the literature.

For example, the literature reports that decanoyl peroxide melts and decomposes at about 42° C. Similarly, the literature states that lauroyl peroxide melts and decomposes at about 53° C. Because of the decomposition factor, both from a hazard standpoint and an economic standpoint, i.e., if decomposition occurs yields of the desired end product will necessarily be low or absent, no consideration has heretofore been given to any process for preparing materials such as these which included a heating step in the vicinity of the melting point of the materials. Yet the present invention utilizes as its principal step the adjustment of the temperatures of these materials to a point of above its melting temperature to create the desired fluid condition.

As mentioned, not only has the above heating technique been found to enable water to be separated from the peroxide, but an unanticipated bonus by way of impurity removal is also obtained. As will be demonstrated hereinafter, the present process provides products having an improved purity that differs sharply from the purity of many presently available commercial fatty acid peroxides.

The present process is applicable generally to fatty acid peroxides that are normally solids at room temperature. This generally comprises those fatty acid peroxides having 20 or more carbon atoms starting with decanoyl peroxide and proceeding up the homologous series of compounds having increasing numbers of carbon atoms. For practical purposes the higher molecular weight fatty acid peroxides are of little interest because of their low active oxygen content. Accordingly, the preferred embodiment employs fatty acid peroxides having from about 20 to 40 carbon atoms (conventionally synthesized from fatty acids having 10 to 20 carbon atoms respectively).

In general, the process is executed on a starting material including the fatty acid peroxide containing some water to be separated therefrom and impurities from the preparative reaction and equipment used. For example, freshly synthesized fatty acid peroxide containing residual water may represent the material for the starting point of the present invention. This material is then heated above the melting point of the fatty acid peroxide. The precise temperature employed is subject to some variation for purposes of the present invention. The temperature should be selected to liquify the peroxide but should be kept below the decomposition temperature of the peroxide. In most cases heating of the peroxide-water mixture to about 2° to 3° above the melting point of the peroxide will accomplish the desired purpose. For example, in the case of decanoyl peroxide which melts at 42° C., a temperature of about 45° C. may be used. In the case of lauroyl peroxide which melts at 53° C., a temperature of about 55° C. is quite suitable.

Once the peroxide has been liquified the water and peroxide phases will separate if allowed to stand due to gravity and the non-miscibility of the liquid phase and the organic phase. Separation can be easily accomplished simply by decanting or drawing off either of the separated phases. Another alternative is to use a centrifuge for accomplishing the same purpose.

Following separation of the organic phase the peroxide is then resolidified by cooling the same. The selected cooling technique will govern the physical size and shape of the peroxide particles. As will be described more fully hereinafter, drum cooling and scraping can be used to produce peroxide flakes. Smaller particles can be obtained by atomizing and spraying the liquid peroxide into a cool atmosphere. Many other variations are possible and are contemplated as being within the scope of the present invention.

Following this sequence of steps, the end peroxide product is almost completely free of moisture and other impurities. Because the process can be practiced almost as fast as the materials can be heated, it will be appreciated that extremely high capacity and production rates will result from the present invention.

More specifically, and with respect to the accompanying flow sheet, a suitable fatty acid peroxide such as decanoyl peroxide containing water and impurities to be separated is fed into slurry tank 1. Water is also metered into tank 1 as required to create the desired slurry consistency. The water introduced at this stage is for the purpose of creating a flowable substance that can be easily transported through the subsequent conduits and equipment. Where large scale production is not contemplated, the addition of water may be omitted and the mass simply handled on a batch basis and heated. If the product already contains sufficient water for this purpose, no additional water may be added at this point. The amount of water required will be determined on an empirical basis. It has been found that slurries consisting of about 1 pound of solids to about 7 to 10 pounds of water present readily flowable and workable compositions for present purposes.

Following preparation in slurry tank 1, the material is pumped through conduits by means of a suitable pump 2 to a heat exchanger 3. During its residence in heat exchanger 3 the slurry is raised to the desired temperature to create the liquification of the solid fatty acid peroxide. In the preferred embodiment a glass heat exchanger is utilized and hot water passed through the outer jacket. It has been found that where the hot water is maintained at about five degrees higher than the temperature to which the slurry is to be adjusted satisfactory results are achieved. Thus, in the case of the decanoyl peroxide where it is desired to melt and maintain the mixture at about 45° C., the water is generally maintained at about 50° C. In the case of the lauroyl peroxide where it is desired to melt and maintain the mixture at about 55° C., the water may be held at about 60° C.

The molten peroxide-water mixture is then transported for the separation step. The peroxide should, of course, be maintained at its elevated molten temperature during the separation step and for this purpose a separator can either be properly insulated or contain heating elements itself. In the preferred embodiment illustrated, separator 4 is a gravity separator or a centrifuge. In either case the water layer containing impurities and the organic peroxide layer are discharged from different exit ports as illustrated.

The separated molten peroxide layer is then transported to a cooling station 5 for solidification into the desired particle size and shape. As illustrated in the drawing, flakes are prepared by collecting the molten peroxide in a pool. An internally chilled drum is then rotated so as to pass beneath the surface of the melt and pick up a layer of the melt on its surface. Upon contact with the chilled drum surface the molten layer solidifies. As the drum rotates the solidified peroxide layer is conveniently removed therefrom by any suitable device such as a doctor or knife blade. By controlling the speed of the drum, flakes of any desired size can be produced.

The above process is readily practiced upon the synthesized fatty acid product without need of prior treatment or preliminary adjustments. Consequently, it is possible to supply a peroxide slurry to tank 1 having the acid to neutral pH normally used in making and processing these materials. Acid conditions are normally employed because of the known decomposition and salt formation that occurs when fatty acid peroxides are maintained in alkaline solution.

In connection with the present process it has been discovered that if the process is executed on an alkaline slurry, preferably having a pH of about 9 to 11, purification and separation of impurities with the aqueous phase is significantly enhanced. Decomposition of the peroxide in the alkaline medium is not experienced especially if the processing times during elevated temperatures are kept short, i.e., on the order of about one minute total time. For example, if the total time in heat exchanger 3 is held to about 45 seconds (the peroxide will be in a melted state for only about 15 seconds of this time), and if separator 4 is a very fast centrifuge so that residence time at that point can be held to about 4 minutes and 45 seconds (giving a total heating time of less than about 5 minutes) no decomposition is found. At the same time unusual and heretofore unobtainable purities result. It will be understood that the times given are merely exemplary and reasonable variation is possible.

The following analytical results of decanoyl peroxide prepared in accordance with the present invention show the improved purities provided by it. For comparison, an analysis of a typical commercially offered decanoyl peroxide is shown.

|  | Typical Commercial Product | Product of Present Process (Initial pH 3-7) | Product of Present Process (Initial pH 9-11) |
| --- | --- | --- | --- |
| Purity, percent | 95.5 | 97.90 | 99.13 |
| Decanoic Acid Content | .60-.75 | 0.43 | 0.20 |
| Soaps as Calcium Decanoate | 1.0 | 0.17 | 0.12 |
| Sodium Chloride | 0.1-.15 | 0.06 | 0.06 |
| Iron Content, p.p.m | 10 | 3 | 3 |

It should be noted that the present process shows significant improvement over present practices (in soaps and iron in particular) regardless of pH. However, the use of alkaline pH's is superior to the use of acid pH's.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for separating water and impurities from a mixture of water and an impure fatty acid peroxide having at least 20 carbon atoms comprising: adjusting the temperature of said mixture to above the melting point of said peroxide but below its decomposition temperature to liquify the peroxide, physically separating the aqueous phase with impurities from the liquid peroxide phase while maintaining the liquid phase above its melting point, and then cooling the dry, purified peroxide phase to solidify the same.

2. A method for separating the water and impurities from a mixture of water and an impure fatty acid peroxide having at least 20 carbon atoms comprising: heating said mixture to about 2-3 degrees above the melting point of said peroxide to liquify the peroxide, physically separating the aqueous phase with impurities from the liquified peroxide phase by virtue of the non-miscibility of the two liquid phases while maintaining at least said liquid peroxide phase at said elevated temperature, and then cooling the dry, purified peroxide phase to solidify the same.

3. A method in accordance with claim 2 wherein said physical separation is executed by allowing the two liquid phases to stand and separate by operation of gravity into an upper peroxide phase and a lower aqueous phase, and then drawing off the upper peroxide phase.

4. A method in accordance with claim 2 wherein said physical separation is executed by subjecting said aqueous phase and liquified peroxide phase to centrifugal forces.

5. A method in accordance with claim 2 wherein said cooling step is executed by passing an internally chilled drum through a pool of water-free liquified peroxide, a layer of peroxide thereby solidifying and adhering to said drum surface, and then scraping the adhered peroxide layer from said drum surface into a flaked form.

6. A method in accordance with claim 2 wherein said cooling step is executed by forcing said water-free liquid peroxide through an atomizer to form a plurality of liquid particles, and directing said plurality of liquified particles into a chilled atmosphere.

7. An improved method for purifying and drying synthesized lauroyl peroxide containing relatively small amounts of water and impurities comprising: slurrying said peroxide in sufficient water to facilitate fluid flow of the slurry, heating said slurry to about 55° C. to liquify the lauroyl peroxide, and physically separating the aqueous phase with the impurities from the liquified lauroyl peroxide phase by virtue of the non-miscibility of the two liquid phases while maintaining the lauroyl peroxide at about 55° C., and then cooling the dry, purified, liquid lauroyl peroxide to form solid particles.

8. An improved method for purifying and drying synthesized decanoyl peroxide containing relatively small amounts of water and impurities comprising: slurrying said peroxide in sufficient water to facilitate fluid flow of the slurry, heating said slurry to about 45° C. to liquify the decanoyl peroxide, and physically separating the aqueous phase with the impurities from the liquified decanoyl peroxide phase by virtue of the non-miscibility of the two liquid phases while maintaining the decanoyl peroxide at about 45° C., and then cooling the dry, purified, liquid decanoyl peroxide to form solid particles.

9. A purification method for a fatty acid peroxide having at least 20 carbon atoms comprising: providing a mixture of water and said peroxide having an alkaline pH, rapidly heating said mixture to liquify the same without decomposition and physically separating the aqueous phase with impurities from the liquid peroxide phase while maintaining the purified peroxide in the liquid phase as it is being separated, and then cooling the dry, purified peroxide phase to solidify the same.

10. A method in accordance with claim 9 wherein the pH of said alkaline mixture is about 9–11.

11. A method in accordance with claim 9 wherein said heating step has a duration of less than five minutes.

References Cited

UNITED STATES PATENTS

| 81,495 | 8/1868 | Gwynn | 260—406 |
| 1,482,483 | 2/1924 | Quick | 260—406 |
| 2,488,680 | 11/1949 | Novack | 260—406 |
| 3,190,904 | 6/1965 | Spoors et al. | 260—502 |
| 3,231,605 | 1/1966 | Blumbergs | 260—502 |

FOREIGN PATENTS

| 109,804 | 1/1964 | Czechoslovakia. |
| 640,244 | 3/1962 | Italy. |

OTHER REFERENCES

Kore: Chemical Abstracts, vol. 53 (1931), col. 18853b.
Parker: J. Am. Chem. Soc., vol. 79 (1957), pp. 1929–31.

ALEX MAZEL, *Primary Examiner.*

R. GALLAGHER, *Assistant Examiner.*